July 31, 1934.    C. F. SENKEWITZ    1,968,058
STUD DRIVER
Filed Feb. 28, 1933
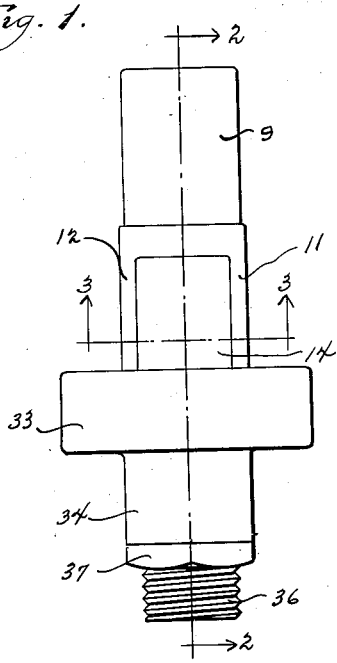
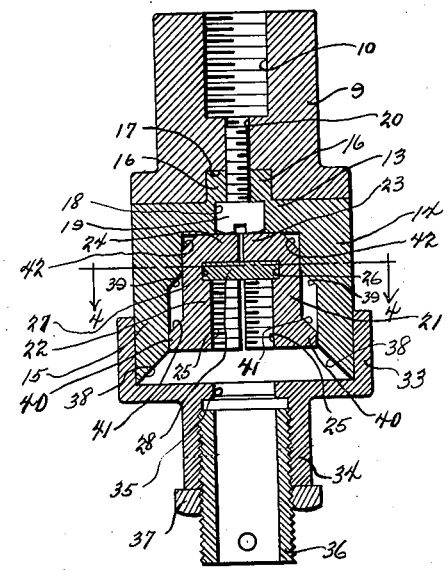
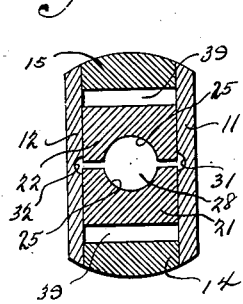
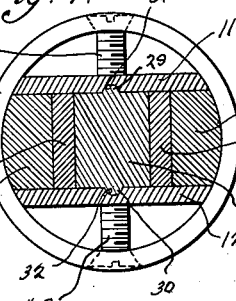
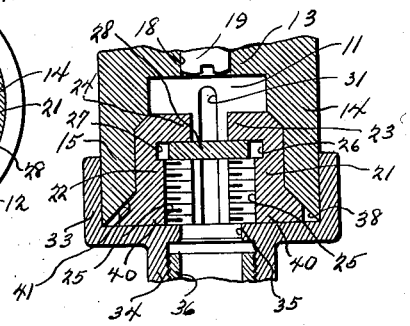
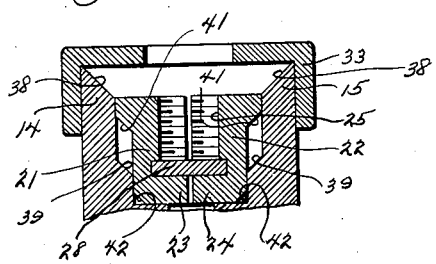
INVENTOR.
Charles F. Senkewitz
BY
ATTORNEY.

Patented July 31, 1934

1,968,058

UNITED STATES PATENT OFFICE 1,968,058

STUD DRIVER

Charles F. Senkewitz, Dearborn, Mich.

Application February 28, 1933, Serial No. 658,977

4 Claims. (Cl. 81—53)

My invention relates to a new and useful improvement in a stud driver and has for its object the provision of a stud driver which will be simple in structure, economical of manufacture, durable, and highly efficient in use.

Another object of the invention is the provision of a stud driver having a pair of gripping jaws movable relatively to a carrier and so arranged that upon movement of the jaws to releasing position, the centrifugal action resulting from a rotation of the driver will effect a release of the jaws.

Another object of the invention is the provision in a stud driver of engaging jaws mounted in a suitable carrier so arranged and constructed as to prevent a relative rotation of the jaws to the carrier.

Other objects will appear hereinafter.

The invention consists in the combination and arrangement of parts hereinafter described and claimed.

The invention will be best understood by a reference to the accompanying drawing which forms a part of this specification, and in which, Fig. 1 is a side elevational view of the invention.

Fig. 2 is a central sectional view taken on line 2—2 of Fig. 1.

Fig. 3 is a sectional view taken on line 3—3 of Fig. 1.

Fig. 4 is a sectional view taken on line 4—4 of Fig. 2.

Fig. 5 is a fragmentary sectional view similar to Fig. 2 illustrating the jaws in releasing position.

Fig. 6 is a fragmentary sectional view of a slightly modified form of the invention.

In the form illustrated, I have indicated a shank 9 provided with the internally threaded bore 10 which may be attached to a suitable driving shaft whereby the device may be rotated. It is obvious that the shank 9 itself may be inserted in a suitable chuck or the like for effecting a rotation of the device. This shank 9 carries a yoke comprising the side plates 11 and 12 which serve to embrace a U-shaped jaw guide embodying the bight or base 13 and the legs 14 and 15. Projecting from the bight or base 13 is a cylindrical neck 16 engaging in the recess 17 formed in the shank 9. The bight or base 13 is provided with a recess 18 in which engages the head 19 on a screw which is projected through the neck 16 and screwed into the passage 20 formed in the shank 9 so that the jaw guide is securely mounted in position on the shank 9 and embraced at opposite sides by the yoke arms 11 and 12.

A pair of gripping jaws 21 and 22 having the angularly turned ends 23 and 24, respectively, are slidably positioned between the guide legs 14 and 15, and the angular turned ends 23 and 24 are directed inwardly toward each other. The inner surface 25 of these jaws is formed arcuate and threaded for engaging about a threaded stud to be driven. In the base of each of these jaws, on the inner surface, there are formed recesses 26 and 27 which are in alignment with each other to provide guide ways for an abutment plate 28 which engages therein. From opposite ends of the abutment plate 28 project the bosses 29 and 30 which are adapted to ride in grooves 31 and 32, respectively, formed in the yoke arms or plates 11 and 12.

The ends of the legs 14 and 15 are embraced by the cup-shaped member 33 which is provided with the outwardly projecting internally threaded neck 34, surrounding the opening 35 formed in its base. This opening 35 aligns with the opening defined by the inner surfaces 25 of the gripping jaws. A guide sleeve 36 is threaded through the neck 34 and secured in its various positions of axial movement relatively thereto by the lock nut 37.

The legs 14 and 15 terminate in the chamfer or bevel 38 and a bevel or inclined shoulder 39 is formed on each of the legs 14 and 15 inwardly of the ends. A flange 40 is formed on the outer ends of the outer surface of each of the jaws 21 and 22, this flange having a beveled inner surface 41. The inner ends of the edge of the jaws is cut away to provide the beveled surface 42, the space between the surfaces 41 and 42 being the same distance as the space between the beveled or inclined surfaces 38 and 39.

In operation, when the jaws 21 and 22 are moved so that the surfaces 41 and 38 are in alignment, the surfaces 42 and 39 will also be in alignment and a rotation of the device will effect an outward swinging of the jaws 21 and 22 so that the surfaces 41 and 38 will engage as will likewise the surfaces 39 and 42, because of the centrifugal force operating upon the jaws 21 and 22. The jaws are thus in released position and when the device is positioned over a stud, the stud passing through the sleeve 36 and the opening 35 may be moved inwardly of the jaws 21 and 22 until its end engages the engagement plate 28. Further thrust will carry the jaws inwardly of the guide legs 14 and 15 and the surfaces 42 and 41 will ride off of the surfaces 39 and 38 respectively, and thus the jaws 21 and 22 will be securely clamped about the stud so as to grip it for rotating the same. As the rotation of the stud is effected, a driving of the same results, and when the stud has been driven inwardly a sufficient distance so that the end of the sleeve 36 engages the work piece into which the stud is being driven, a further rotation of the device will effect an outward movement of the jaws 21 and 22 as they will follow the stud which continues to be driven until the surfaces 39 and 42, and 38 and 41, again register, whereupon the jaws will release the stud and device may be removed therefrom.

Screws 43 project through cup-shaped member 33 and engage the faces of the yoke plates 11 and 12 to retain this member 33 in position to function as a cap to prevent displacement of the jaws 21 and 22 from between the guide legs 14 and 15.

It is obvious that the depth of driving may be regulated by axial movement of the sleeve 36, so that I have thus provided an adjustable means which may be easily and quickly operated to regulate the depth of driving.

In Fig. 6 I have shown the cap 33 formed with the neck 34 eliminated, which also necessitates the elimination of the adjustment sleeve 36 and the lock nut 37. The operation of the jaws is the same as already described for the form shown in the other views. This type of device is intended for use on a machine which has an automatic stop.

While I have illustrated and described the preferred form of structure shown, I do not wish to limit myself to the precise details of structure shown but desire to avail myself of such variations and modifications as may come within the scope of the appended claims.

Having thus described my invention, what I claim as new and desire to secure by Letters Patent is:

1. A stud driver of the class described comprising: a shank; a pair of spaced plates projecting outwardly from opposite sides of one end of said shank; a U-shaped guide member positioned between said plates and having flat faces on opposite sides engaging the inner faces of said plates; means for securing said guide member in position between said plates; a pair of gripping jaws slidably mounted between the legs of said guide members; and means on said jaws cooperating with means on said guide member for moving said jaws to clamping position upon inward movement of said jaws relatively to said guide member.

2. A stud driver of the class described comprising: a shank; a pair of spaced plates projecting outwardly from opposite sides of one end of said shank; a guide member positioned between said plates and having flat faces on opposite sides engaging the inner faces of said plates; means for securing said guide member between said plates; a pair of relatively movable jaws slidably positioned in said guide member; and means on said jaws cooperating with means on said guide member for moving said jaws to clamping position upon inward movement of the same relatively to said guide member a pre-determined position.

3. A stud driver of the class described comprising: a shank; a pair of spaced plates carried by said shank; a guide member positioned between said plates and having flat faces on opposite sides engaging the inner faces of said plates; means for securing said guide member in position between said plates; a pair of separated relatively movable jaws slidably positioned in said guide member; an abutment plate engaging said jaws adjacent their inner ends for preventing axial relative movement of said jaws; each of the plates of said pair of plates having a longitudinally extending groove formed therein; and means on said abutment plate engaging in said grooves for guiding said abutment plate upon axial movement.

4. A stud driver of the class described, comprising a shank; a pair of spaced plates carried by said shank and projecting axially thereof; a U shaped guide member positioned between said plates and having flat faces engaging the inner faces of said plates; means for securing said guide member in position between said plates, the legs of said U shaped guide member having flat surfaces on the inner faces thereof; a pair of separated relatively movable jaws slidably positioned between the legs of said guide member and having flat surfaces adapted for engagement with the flat surfaces of said legs; and means on said jaws cooperating with means on said legs for moving said jaws inwardly of each other for clamping a stud upon inward movement of said jaws relatively to said legs a predetermined distance.

CHARLES F. SENKEWITZ.